A. J. BROWN AND A. A. SOMERVILLE.
HOSE COUPLING.
APPLICATION FILED JUNE 26, 1918.
1,326,250.
Patented Dec. 30, 1919.
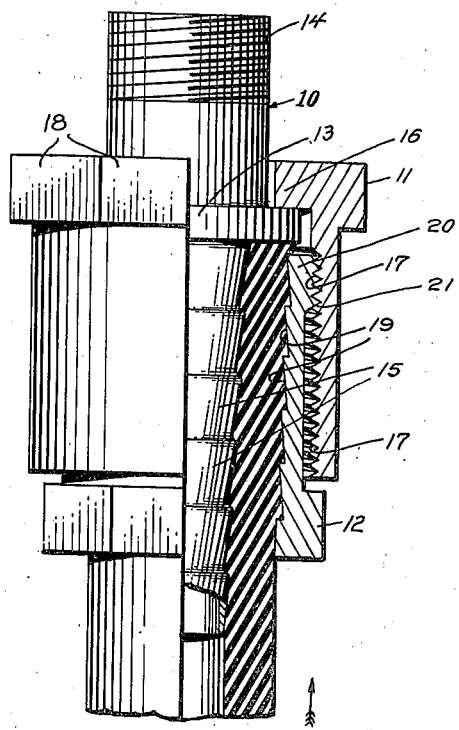
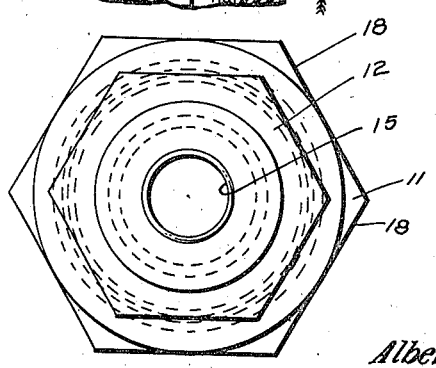
Inventors,
Albert A. Somerville
and Arthur J. Brown,
By their Attorney
Ernest Hopkinson

UNITED STATES PATENT OFFICE.

ARTHUR J. BROWN, OF UNION HILL, NEW JERSEY, AND ALBERT A. SOMERVILLE, OF FLUSHING, NEW YORK, ASSIGNORS TO NEW YORK BELTING & PACKING COMPANY, A CORPORATION OF NEW YORK.

HOSE-COUPLING.

1,326,250.      Specification of Letters Patent.      Patented Dec. 30, 1919.

Application filed June 26, 1918. Serial No. 241,966.

*To all whom it may concern:*

Be it known that we, ARTHUR J. BROWN, a citizen of the United States, residing at Union Hill, county of Hudson, and State of New Jersey, and ALBERT A. SOMERVILLE, a citizen of the United States, residing at Flushing, L. I., county of Queens, and State of New York, have invented Improved Hose-Couplings, of which the following is a full, clear, and exact description.

This invention relates to hose couplings and has for an object to provide improved means for making connections with flexible hose, the aim being to secure a strong, compact, simple, leak-proof, and efficient coupling which may be easily attached to or detached from the hose and which when applied will maintain a firm grip upon the hose without weakening it and at the same time permit the hose to be freely flexed without danger of rupture.

Other objects of the invention will hereinafter appear.

In the accompanying drawings illustrating the invention:

Figure 1 is a longitudinal view with portions broken away, illustrating the improved coupling applied to the end of a hose;

Fig. 2 is an end view, taken in the direction of the arrow, of the construction shown in Fig. 1.

The hose coupling illustrated in the drawings embodies a tapered nipple member 10 adapted to be inserted in the end of a hose, and two interfitting sleeve members 11 and 12 adapted to surround the outside of the hose and to coöperate with the nipple member to firmly clamp the coupling in place.

The nipple member 10 consists of a hollow tube formed intermediate its length with an external annular shoulder 13. One end of the nipple member is provided with an external screw thread 14 to afford means for connecting the coupling to a receptacle or conduit; while the other end of the member is tapered and formed with a plurality of annular ribs or shoulders 15, each of the ribs being inclined to meet the base of the next adjacent rib. The tapered end of the nipple is adapted to be wedged into the end of the hose, and the annular ribs operate to bite into the hose thus preventing the member from being displaced.

The outer sleeve member 11 is substantially cylindrical in shape and is hollow from end to end. It is formed at one end with an inwardly disposed annular shoulder 16 adapted to coöperate with the annular shoulder 13 on the nipple member to force the nipple member into the hose and retain it in position. The interior surface of the outer sleeve member is provided with a screw thread 17 adapted to engage a screw thread formed on the inner sleeve member 12. To enable the outer sleeve member to be gripped by a wrench or other tool, its shouldered end is provided externally with a plurality of flat surfaces 18.

The inner sleeve member 12 is substantially cylindrical in shape and is made hollow from end to end. It is formed upon its inner surface with a plurality of annular ribs or shoulders 19, each of said ribs being inclined to meet the base of the next adjacent rib. The ribs are adapted to bite into the hose when the coupling is applied and serve to prevent the member from being pulled loose from the hose. One end of the member is provided with an external annular shoulder 20 formed with screw threads 21 which engage the threaded interior of the outer sleeve member when the parts are assembled. The other end of the member is formed externally with a number of flat surfaces to afford suitable purchase for a wrench.

In applying the improved coupling to a hose, the inner sleeve member 12, which is made of a size to snugly fit the outside of the hose, is pushed in place upon the end of the hose. The tapered end of the nipple member is then pushed into the inside of the hose and operates to press the hose into the grooves between the ribs 19 on the inner sleeve member. The outer sleeve member 11 is next applied, being passed over the threaded end of the nipple member 10 and screwed onto the inner sleeve member 12. As the outer sleeve member is screwed into place, its annular shoulder 16 engages the annular shoulder 13 of the nipple member, forcing the tapered end of the nipple member farther into the hose. Moreover as the sleeve 12 and shoulder 13 are drawn together the shoulders on the sleeve 12 crowd the hose material toward the end, at which point the material is under the greatest compression. It is to be observed that by reason of this greater compression the hose will be more tightly gripped at its extreme end than at the point where it meets the coupling, which feature permits the hose to be freely flexed without liability of rupture.

The invention provides a strong, efficient, leak-proof coupling that can be conveniently applied to or removed from the end of a hose and which when applied will grip the hose firmly without injuring it and at the same time permit the hose to be freely flexed without liability of rupture at the point where it meets the coupling.

Although one of the preferred embodiments of our invention has been described, it is to be understood that various modifications may be resorted to without departing from the spirit and scope of the invention set forth in the appended claims.

Having thus described our invention, what we claim and desire to protect by Letters Patent is:

1. A hose coupling embodying a nipple member having an external annular shoulder and a tapered end formed with a plurality of shoulders directed toward said external shoulder and adapted to secure the nipple member against retraction from the hose, an inner sleeve member adapted to surround the end of the hose and formed on its outer surface with a screw thread and on its inner surface with a plurality of shoulders directed toward said external shoulders and adapted to engage the outside of the hose and hold the sleeve member against longitudinal movement, and an outer sleeve member adapted to fit over the inner sleeve member and formed at one end with an annular shoulder adapted to engage the annular shoulder on the nipple member, said outer sleeve member being provided on its inner surface with a screw thread adapted to engage the threaded surface of the inner sleeve member, whereby the material adjacent the end of the hose is crowded toward said end and at the same time highly compressed.

2. A hose coupling embodying a nipple member having an external annular shoulder and a tapered end formed with a plurality of annular shoulders directed toward said external shoulder and adapted to secure the nipple member against retraction from the hose, an inner sleeve member adapted to surround the end of the hose and formed on its outer surface with a screw thread and on its inner surface with a plurality of annular shoulders directed toward said external shoulder and adapted to engage the outside of the hose and hold the sleeve member against longitudinal movement in one direction, the outer surface of said tapered end and the inner surface of the sleeve member being relatively inclined, and an outer sleeve member adapted to fit over the inner sleeve member and formed at one end with an annular shoulder adapted to engage the annular shoulder on the nipple member, said outer sleeve member being provided on its inner surface with a screw thread adapted to engage the threaded surface of the inner sleeve member, whereby the material adjacent the end of the hose is crowded toward said end and at the same time highly compressed.

Signed at New Durham, New Jersey, this 24th day of June, 1918.

ARTHUR J. BROWN.

Signed at New York, New York, this 22nd day of June, 1918.

ALBERT A. SOMERVILLE.